Dec. 25, 1923.  
E. L. WIEGAND  
ELECTRICAL HEATING ELEMENT WINDING APPARATUS  
Filed Dec. 22, 1920  
1,478,465  
2 Sheets-Sheet 1
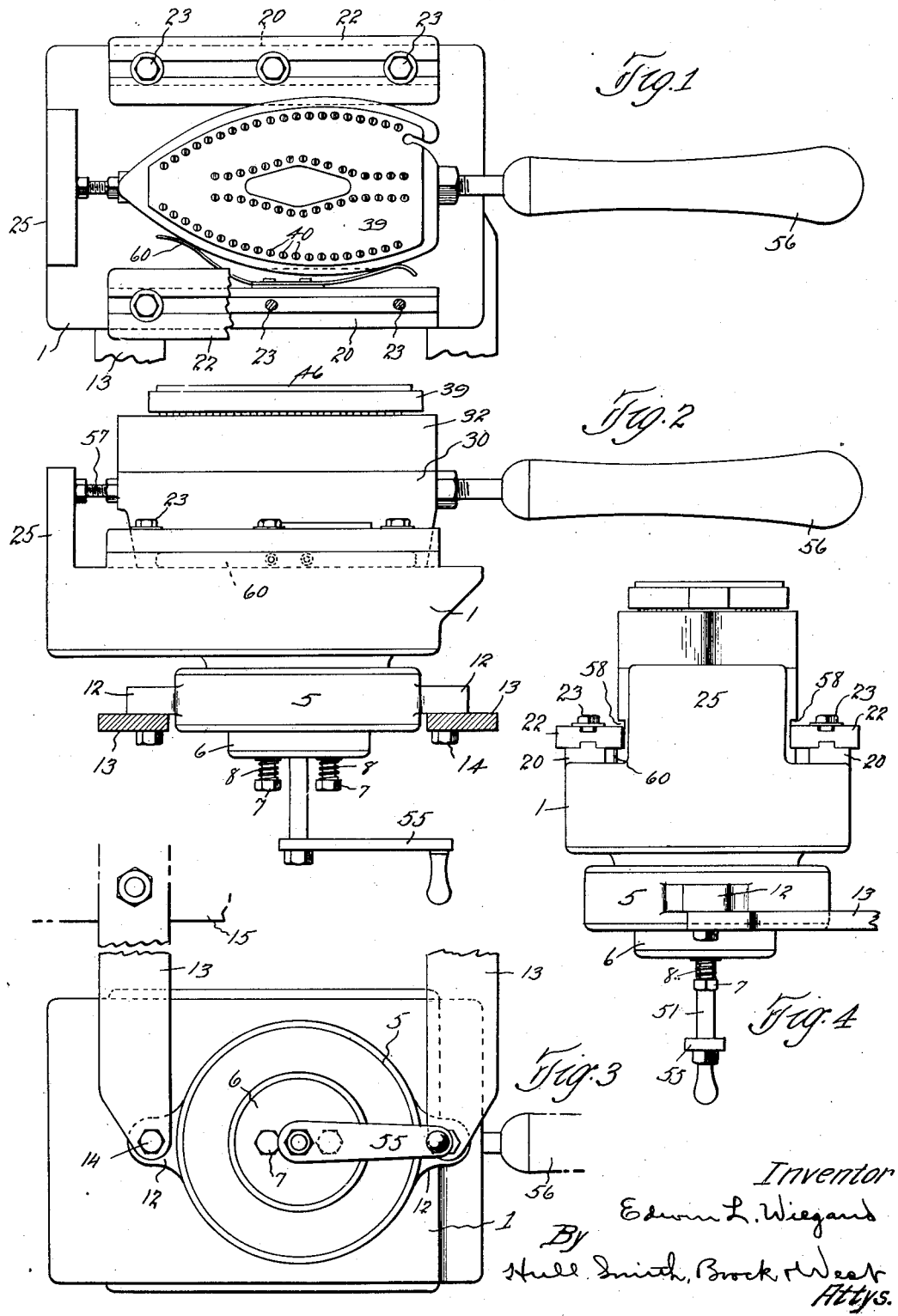
Inventor  
Edwin L. Wiegand  
By Hull Smith, Brock & West  
Attys.

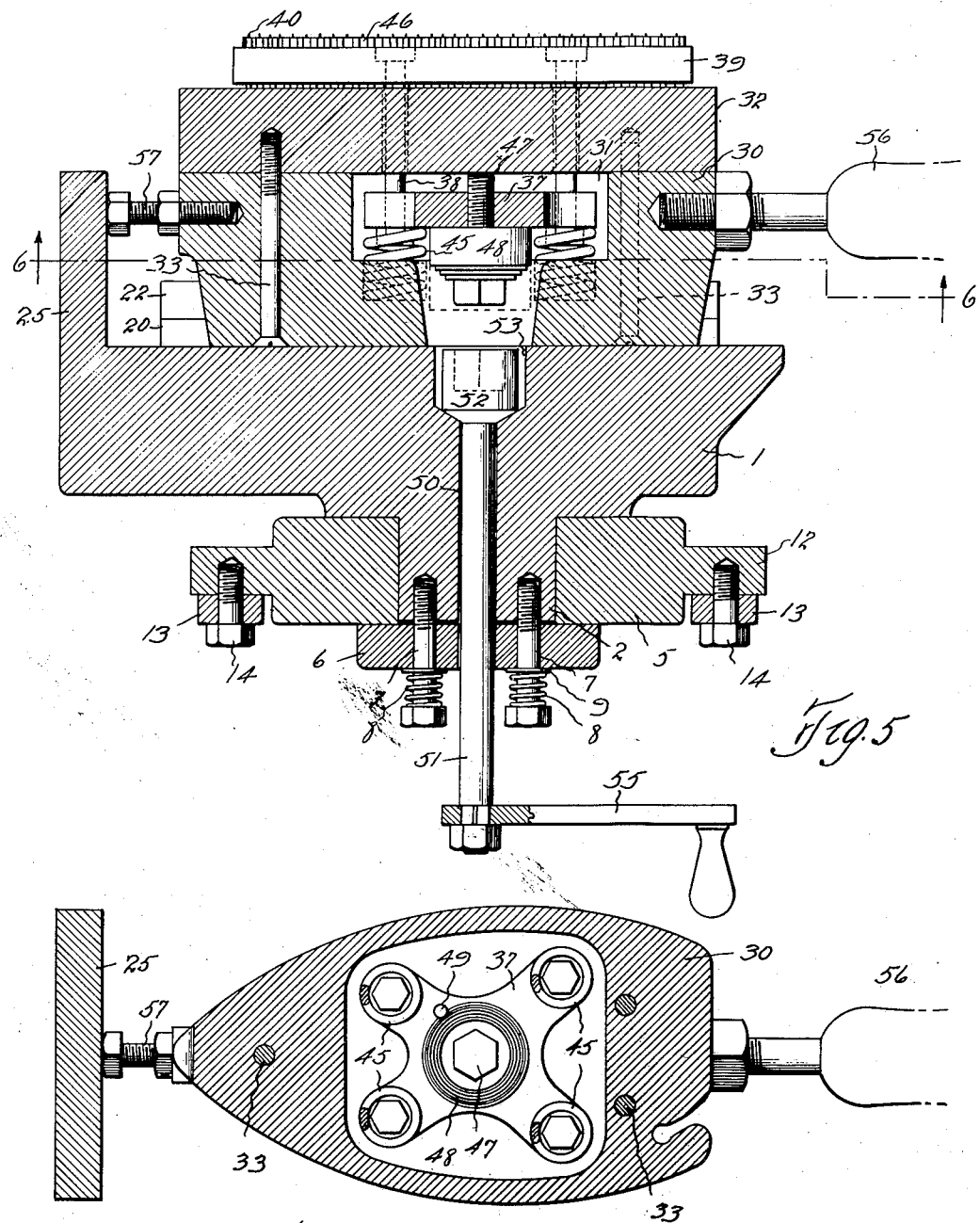

Patented Dec. 25, 1923.

1,478,465

UNITED STATES PATENT OFFICE.

EDWIN L. WIEGAND, OF PITTSBURGH, PENNSYLVANIA.

ELECTRICAL-HEATING-ELEMENT WINDING APPARATUS.

Application filed December 22, 1920. Serial No. 432,373.

*To all whom it may concern:*

Be it known that I, EDWIN L. WIEGAND, a citizen of the United States, residing at Pittsburgh, in the county of Allegheny and State of Pennsylvania, have invented a certain new and useful Improvement in Electrical-Heating-Element Winding Apparatus, of which the following is a full, clear, and exact description, reference being had to the accompanying drawings.

This invention relates generally to the art of electric heating, or more specifically, to apparatus for manufacturing electrical heating devices; and my present invention is one of a series which I have made in the direction of systematizing, expediting and cheapening the production of electrical heating units.

In my copending applications, Serial Nos. 408,360 and 423,470, filed respectively on the 4th day of September, 1920, and the 11th day of November, 1920, I have shown power driven machines for emplacing the conductive member or resistor elements of electrical heating devices in the supporting and insulating matrix. These machines, which are in the nature of presses, involve two relatively movable parts to one of which a base is applied that contains the supporting and insulating matrix, and by the other of which an element carrying form is removably supported in operative relation to the base so that when the machine is operated the element is properly embedded within the base. The element carrying forms that are employed in connection with these machines incorporate mechanism for removing or stripping the element from the element supporting pins; and in certain embodiments, this mechanism is self-acting and operates when pressure is imposed upon it as when the aforesaid machine parts approach each other to emplace the element within the base, while in other embodiments the stripping mechanism is actuated by a moving part of the emplacing machine which cooperates with said mechanism.

Prior to these machines, the winding forms were incorporated in and constituted a permanent part of the emplacing apparatus, and the speed of production depended upon the speed at which the elements could be wound upon the forms, for it takes considerably longer to wind an element on a form than it does to emplace the element in the base. It is expedient therefore to separate these operations by providing different machines for performing the two steps so that the emplacing apparatus will not be tied up during the winding operation.

The purpose of my present invention is to provide apparatus that is independent of the former machines but intended for conjoint use therewith or with other machines of like function, and which will facilitate production by allowing the elements to be wound upon the forms independently of and apart from the emplacing apparatus and in sufficient quantity, by providing the required number of winding apparatus for each emplacing machine, to keep the emplacing machine in continual operation, my present invention thus contributing to the general objects sought to be attained through the series of inventions hereinbefore referred to.

More specifically, my present invention comprehends the provision of an element winding apparatus into which the element carrying forms may be easily and quickly placed; wherein the forms will be properly supported for a convenient winding of the elements upon the element supporting pins (the nature of the apparatus enabling the forms to be easily turned to facilitate the winding operation); and from which the forms may be readily removed for application to the emplacing machine.

Further objects are to make this apparatus adaptable to the winding of both types of forms hereinbefore referred to: the one wherein the stripping or removing mechanism is self-acting, and the other wherein said mechanism is mechanically actuated by a cooperating part of the machine; to incorporate within the apparatus means for conveniently "setting" the self-acting stripping mechanism preparatory to winding the element upon the element supporting pins, and for placing the mechanism in condition for automatic operation when the form is subjected to the action of the emplacing machine; and to provide means for securely holding the form within the apparatus during the winding operation.

The foregoing objects, and others which will become apparent as this description proceeds, are attained in the construction set out in the claims annexed hereto and illustrated in the drawings accompanying and forming a part hereof and wherein similar reference characters designate corresponding parts throughout the several views.

In the drawings, Fig. 1 is a top plan, Fig. 2 a side elevation, Fig. 3 a bottom plan, and Fig. 4 a left hand end elevation of the winding apparatus; Fig. 5 is a central vertical section through the apparatus on a scale enlarged over that of the preceding figures; and Fig. 6 is a section on the line 6—6 of Fig. 5, looking in the direction of the arrows.

To facilitate the winding of the heating or resistor element upon the element supporting pins of the form, it is essential that the form be capable of turning, yet not too freely, in a horizontal plane. To this end the turret 1, which supports the form, has a reduced portion or shank 2 that is journaled in a collar 5 and is held against withdrawal therefrom by a retaining plate 6 that is secured to the shank 2 by means of screws 7, there being springs 8 compressed between the heads of the screws and washers 9, that are applied to the adjacent face of the retaining plate, for maintaining it with the desired degree of pressure against the underside of the collar 5. By this manner of mounting, the turret may be readily turned and held in any desired position, and against too free a movement by reason of the frictional engagement of the retaining plate with the collar. The collar is supported, through lugs 12, from arms 13 to which the lugs are connected by screws 14, and the arms 13 may be attached to a bench or other supporting structure 15, (Fig. 3).

Rails 20 rise from and extend along opposite sides of the turret 1 and have slides 22 secured to them by screws 23. A stop 25 is situated at one end of the turret.

For the purpose of illustration I have shown the apparatus as supporting a winding form of the type incorporating the self-acting stripping mechanism already referred to and shown in my above mentioned copending application Serial No. 423,470. This form comprises a body member 30 which contains a cavity 31, and to the face of which is secured a form plate 32 by means of screws 33. The cavity 31 houses a spider 37. Pins 38 which extend through holes in the form plate 32 connect the branches of the spider 37 with a stripping plate 39, the stripping plate being guided upon the element supporting pins 40 which project from the form plate. Comparatively heavy compression springs 45 are interposed between the branches of the spider and opposed walls of the cavity 31 and tend to force the spider in a direction to project the stripping plate 39 along the supporting pins 40 and remove the element 46 from said pins. This action is under the control of a screw 47 that is threaded through the center of the spider and bears upon the inside face of the form plate 32. A spiral spring 48 has one of its ends connected to the screw 47 and its opposite end anchored, through a pin 49, with the spider 37. The spiral spring tends to rotate the screw 47 in a direction to withdraw it from the spider.

Journaled within a bore 50 of the turret 1 and extending through a registering aperture in the retaining plate 6 is a shaft 51 which has an enlargement 52 at its upper end that contains a socket of a size and shape to fit the head of screw 47. The turret has a recess 53 which accommodates the enlargement 52 when the shaft occupies normal position. A crank 55 is applied to the lower end of the shaft and by means of this crank the shaft may be raised and turned. A handle 56 is applied to one end of the form body 30 and an adjustable stop 57 is attached to the other end. The lateral sides of the form body are provided with grooves 58 for cooperation with the slides 22.

In the use of the apparatus, the operator grips a form by the handle 56 and slides it into the turret until the stop 57 engages the stop 25 of the turret. This locates the screw 47 substantially in axial alignment with the socket of the shaft 51, and a spring 60 that is secured to the inner side of one of the rails 20 engages the side of the form and holds it securely against accidental displacement. When the form is placed in the winding apparatus, its stripping plate 39 is fully projected. The first thing that the operator does after placing the form in the winding apparatus is to grasp the crank 55 and elevate the shaft 51 so as to engage its socketed head with the head of the screw 47. He then turns the screw in a direction to retract the spider 37 against the tension of springs 45 and, through the intervention of pins 38, return the stripping plate 39 into contact with the form plate 32, leaving the element supporting pins 40 protruding a material distance beyond the stripping plate.

The intense frictional engagement of the threads, and of the end of screw 47 against the form plate 32, produced by the action of springs 45, prevents the screw from being turned by the spiral spring 48. With the parts in this condition, the operator winds the element 46 on the pins 40 in the usual manner, turning the turret from time to time to suit his convenience, and when this is completed he reengages the socketed head of shaft 51 with screw 47 and retracts it enough to allow the springs 45 to force the spider 37 upwardly and through the intervention of pins 38, lift the stripping plate a slight distance off the form plate 32, as represented in Fig. 5. After dropping the shaft 51 to normal position the operator may remove the form from the apparatus and it is now in readiness for the emplacing apparatus.

I may explain in this connection that when the form is compressed between the opposed relatively movable parts of the emplacing machine in the process of embedding the element 46 in the body of impressionable material which constitutes the supporting and insulating matrix, the stripping plate is moved toward the form plate sufficiently to relieve the frictional engagement between the end of screw 47 and the form plate so that the spiral spring 48 may retract screw 47 and leave the springs 45 free to project the stripping plate along the pins 40 and remove the element 46 therefrom as the form recedes from the base.

Understanding the use of the apparatus with forms of the type above described, it will be clear how the apparatus is used in connection with forms of the type shown in my copending application Serial No. 408,360. The operation of winding the latter type of form is simplified by making unnecessary the manipulation of the shaft 51. In other respects, the winding of the two forms is identical.

Having thus described my invention, what I claim is:

1. In a device of the character described, in combination, a plurality of pins about which a resistance element may be formed, a plate adapted to strip said element from said pins, means supporting both said pins and said plate, means carried by said supporting means for actuating said plate, carrying means adapted to removably support said supporting means, and operating means carried by said carrying means adapted to removably engage said actuating means to operate said actuating means.

2. In a device of the character described, in combination, a form upon which a resistance element may be wound, means for stripping said element from said form, means supporting both said form and said stripping means, means carried by said supporting means for actuating said stripping means, carrying means adapted to removably support said supporting means, and operating means carried by said carrying means adapted to removably engage said actuating means to operate said actuating means.

3. In a device of the character described, in combination, a support, a plurality of pins carried by said support and about which a resistance element may be formed, and a plate movably carried by said support, normally retracted, and adapted by movement relative to said support to strip said element from said pins.

4. In a device of the character described, in combination, a support, a form carried by said support and upon which a resistance element may be wound, and means movably carried by said support, normally retracted, and adapted by its movement relative to said support to strip said element from said form.

5. In apparatus of the character set forth, the combination of a supporting structure involving a collar, a turret having a shank journaled in the collar, and a retaining plate applied to the shank and engaging the collar, the turret being designed to removably receive an element winding form.

6. In apparatus of the character set forth, the combination of a supporting structure involving a collar, a turret having a shank journaled in the collar, and a retaining plate yieldingly attached to the shank and frictionally engaging the collar, the turret being designed to removably receive an element winding form.

7. In a winding device, a form having wire receiving provisions, a stripping device associated with said form for removing the wire, means carried by the form for actuating said stripping device, a support adapted to hold said form during the application of the wire thereto, and means carried by said support for setting said means.

8. In a winding device, in combination, a wire receiving form, a device for stripping the wire therefrom, spring means for actuating said stripping device, means for releasably restraining said spring means, and a support adapted to hold said form in wire receiving position and to permit the adjustment of said spring means and restraining means.

9. In apparatus of the character set forth, the combination of a supporting structure, a turret rotatably sustained thereby, said turret having opposed slides between which an element winding form is adapted to be inserted and having a stop for locating the form within the turret.

10. In apparatus of the character set forth, the combination of a structure designed to removably support an element winding form, of a winding form, a stripping device associated therewith, means carried by said form for actuating said stripping device, and means carried by the structure for engaging and actuating the setting means of the form.

11. In apparatus of the character set forth, the combination of a supporting structure, an element winding form adapted to be removably secured thereto self-acting stripping mechanism carried by said form a member for setting said mechanism, a shaft supported by the structure for longitudinal and rotary movement, said shaft having a part for interlocking engagement with the aforesaid setting means of the form, means for longitudinally moving and rotating the shaft, and a stop for locating the form within the structure with the setting means of the form in operative relation to the aforesaid shaft.

12. In apparatus of the character set forth, the combination of a supporting structure having a collar, a turret having a part journaled within said collar, means for retaining said part within the collar, the turret having a bore, a shaft extending through the bore, means for moving the shaft longitudinally and for rotating it, an element winding form adapted for detachable engagement with self-acting stripping mechanism carried by said form means for setting said mechanism for automatic operation, the aforesaid shaft having a part for interlocking engagement with the setting means of the form, and means for positioning the form within the turret with the setting means in operative relation to the shaft.

13. In apparatus of the character set forth, the combination of a supporting structure having a collar, a turret having a shank journaled within said collar, a retaining plate yieldingly attached to the shank and frictionally engaging the collar, the turret having a bore and the retaining plate an aperture registering therewith, a shaft extending through the bore and aperture, means for moving the shaft longitudinally and for rotating it, a pair of slides supported by the turret in opposed relation to each other and between which an element carrying form is adapted to be inserted, an element winding form, a stripping device carried thereby, spring means carried by said form for actuating said stripping device, means for setting said spring, the aforesaid shaft having a part for interlocking engagement with the setting means of the form, and a stop on the turret for positioning the form within the turret with the setting means in operative relation to the shaft.

14. In a winding apparatus for electrical heating elements in combination a member having provisions for receiving a resistance wire formed in accordance with a preconceived design, a stripping member adapted to eject said wire from said first member without disarrangement thereof and an energy storing device interposed between said members and adapted to actuate said stripping member automatically upon the occurrence of a preconceived condition.

15. In a device of the character described, in combination, a form upon which a flat resistance element may be wound, means for stripping said element from said form, means supporting both said form and said stripping means, means carried by said supporting means for actuating said stripping means, carrying means adapted to removably support said supporting means, and operating means carried by said carrying means adapted to removably engage said actuating means to operate said actuating means.

16. In a device of the character described, in combination, a form upon which a flat resistance element may be wound, means for stripping said element from said form, means supporting both said form and said stripping means, and means carried by said supporting means for actuating said stripping means relative to said supporting means to thus strip said element from said form.

17. In a device of the character described, in combination, a form upon which a resistance element may be wound, means for stripping said element from said form, means supporting both said form and said stripping means, and means carried by said supporting means for actuating said stripping means relative to said supporting means to thus strip said element from said form.

18. In a device of the character described, in combination, a support, a form carried by said support and upon which a flat resistance element may be wound, and means movably carried by said support, normally retracted, and adapted by its movement relative to said support to strip said element from said form.

19. In a device of the character described, in combination, a plurality of pins about which a resistance element may be formed, a plate adapted to strip said element from said pins, means supporting both said pins and said plate, and means carried by said supporting means for actuating said plate relative to said supporting means to thus strip said element from said pins.

In testimony whereof, I hereunto affix my signature.

EDWIN L. WIEGAND.